(12) United States Patent
Brieskorn

(10) Patent No.: US 7,898,107 B2
(45) Date of Patent: Mar. 1, 2011

(54) COMMUNICATION SYSTEM, DISTRIBUTION ELEMENT AND NETWORK DEVICE

(75) Inventor: Jürgen Brieskorn, Geltendorf (DE)

(73) Assignee: Siemens Aktiengesellschaft, Munich (DE)

( * ) Notice: Subject to any disclaimer, the term of this patent is extended or adjusted under 35 U.S.C. 154(b) by 841 days.

(21) Appl. No.: 11/660,641

(22) PCT Filed: Aug. 18, 2005

(86) PCT No.: PCT/EP2005/054068
§ 371 (c)(1),
(2), (4) Date: Feb. 20, 2007

(87) PCT Pub. No.: WO2006/032588
PCT Pub. Date: Mar. 30, 2006

(65) Prior Publication Data
US 2007/0263622 A1  Nov. 15, 2007

(30) Foreign Application Priority Data
Sep. 24, 2004 (DE) .................. 10 2004 046 401

(51) Int. Cl.
*G05F 5/00* (2006.01)
(52) U.S. Cl. .......................... 307/31; 713/300
(58) Field of Classification Search .............. 307/31; 713/300
See application file for complete search history.

(56) References Cited

U.S. PATENT DOCUMENTS

| | | | | |
|---|---|---|---|---|
| 6,016,519 A * | 1/2000 | Chida et al. | .................. | 710/19 |
| 6,535,983 B1 * | 3/2003 | McCormack et al. | ....... | 713/310 |
| 6,985,757 B2 * | 1/2006 | Liu et al. | ..................... | 455/558 |
| 7,111,181 B2 * | 9/2006 | Bell | ........................... | 713/300 |
| 7,145,439 B2 * | 12/2006 | Darshan et al. | ......... | 340/310.11 |
| 7,162,377 B2 * | 1/2007 | Amrod et al. | ................. | 702/60 |
| 7,240,224 B1 * | 7/2007 | Biederman | .................. | 713/300 |
| 7,281,141 B2 * | 10/2007 | Elkayam et al. | ............. | 713/300 |
| 7,392,407 B2 * | 6/2008 | Jonnala et al. | .............. | 713/300 |
| 7,404,091 B1 * | 7/2008 | Gere | .......................... | 713/300 |
| 7,455,527 B2 * | 11/2008 | Nordin et al. | ................. | 439/49 |
| 7,460,889 B2 * | 12/2008 | Darshan et al. | ............. | 455/572 |
| 7,599,485 B2 * | 10/2009 | Karam | ...................... | 379/413 |
| 7,664,136 B2 * | 2/2010 | Toebes et al. | .............. | 370/463 |
| 7,701,092 B1 * | 4/2010 | Parker et al. | ................ | 307/154 |
| 2002/0042229 A1 | 4/2002 | Vergnaud | | |
| 2003/0033098 A1 | 2/2003 | Rakshani et al. | | |

(Continued)

FOREIGN PATENT DOCUMENTS

DE    102 30 120 B3    2/2004

(Continued)

*Primary Examiner*—Jared J Fureman
*Assistant Examiner*—Adi Amrany

(57) ABSTRACT

There is disclosed a communication system comprising a distribution element, which is coupled to a power supply unit and to which a plurality of network devices can be connected. Each network device that is connected to the distribution element comprises at least one network element and each network device is supplied with energy and messages by the distribution element. A sub-assembly that is located in each network device is configured to determine a parameter that characterizes the network from a network of passive components, said parameter allowing an indication of the energy requirements of the network device to be obtained, each of the network elements of the network device having at least one passive component, which forms an integral part of the network.

20 Claims, 1 Drawing Sheet

U.S. PATENT DOCUMENTS

| | | |
|---|---|---|
| 2006/0092000 A1* | 5/2006 | Karam et al. .......... 340/310.11 |
| 2006/0212724 A1* | 9/2006 | Dwelley et al. ............. 713/300 |
| 2008/0198635 A1* | 8/2008 | Hussain et al. ........... 363/21.11 |
| 2008/0276104 A1* | 11/2008 | Hussain et al. .............. 713/300 |
| 2009/0031152 A1* | 1/2009 | Bolderl-Ermel et al. ..... 713/300 |
| 2009/0158377 A1* | 6/2009 | Diab et al. ................. 725/117 |
| 2009/0198812 A1* | 8/2009 | Caveney et al. ............. 709/223 |
| 2009/0327766 A1* | 12/2009 | Ghoshal et al. ............. 713/300 |
| 2010/0042855 A1* | 2/2010 | Karam ....................... 713/310 |

FOREIGN PATENT DOCUMENTS

| | | |
|---|---|---|
| EP | 1 303 078 A1 | 4/2003 |
| JP | 2002182802 A | 6/2002 |
| JP | 2005303593 A | 10/2005 |
| JP | 2006094013 A | 4/2006 |

* cited by examiner

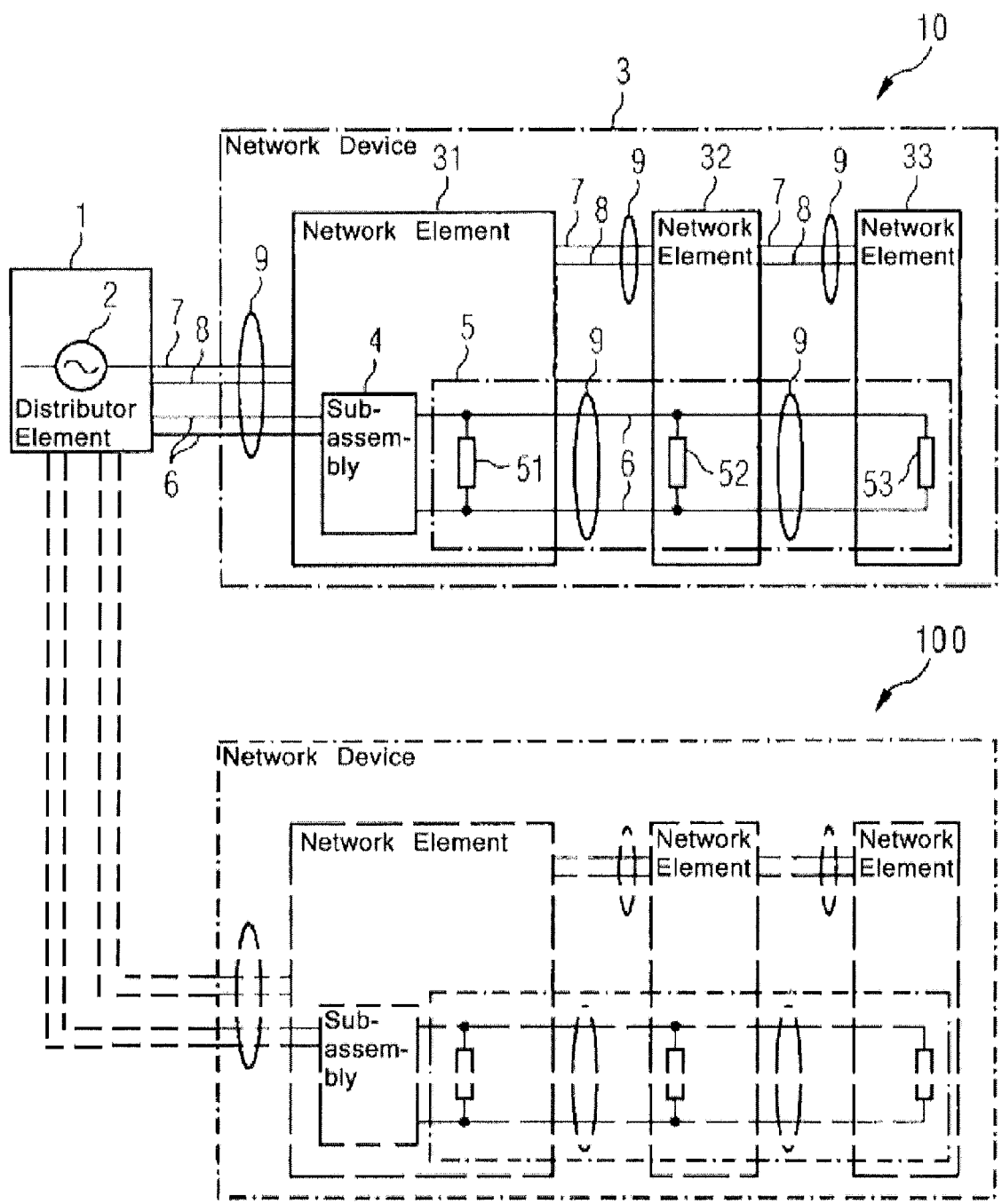

COMMUNICATION SYSTEM, DISTRIBUTION ELEMENT AND NETWORK DEVICE

CROSS REFERENCE TO RELATED APPLICATIONS

This application is the US National Stage of International Application No. PCT/EP2005/054068, filed Aug. 18, 2005 and claims the benefit thereof. The International Application claims the benefits of German application No. 10 2004 046 401.4 DE filed Sep. 24, 2004, both of the applications are incorporated by reference herein in their entirety.

FIELD OF INVENTION

The invention relates to a communication system with a distributor element with a power supply unit, to which a plurality of network devices—in particular a communication terminal—can be connected. The invention also relates to a distributor element and a network device for use in the communication system.

BACKGROUND OF INVENTION

In order to integrate network devices, for example network cameras, speakers, access points for wireless networks or communication terminals, to a greater degree in professional and private daily routines, it is important to reduce the cables required for the connection. Wireless data transmission by way of technologies such as wireless LAN, Bluetooth and DECT does away with the need for what is known as the twisted pair cable required for data transmission but a power cable is still generally needed for the voltage supply. In the standard IEEE 802.3af Power over Ethernet (PoE), energy is supplied to the network devices by way of the twisted pair cable so the power supply cable can be dispensed with. This not only impacts on ease of use for the user but in particular it reduces installation outlay and installation costs for the network operator.

Power over Ethernet is a technology for the wire-based internet, the LAN (Local Area Network) technology most widely used at present. PoE makes it possible to supply the electrical power required for operation of the individual device by way of the data cable instead of by way of power supply cables. This means that the number of cables, which have to be laid to install a network, can be minimized, resulting in lower costs, shorter downtimes, simpler maintenance and greater flexibility during installation. It is then not necessary to equip every access node in the network with an electrical installation and install additional socket outlets. The technology is particularly suitable for applications, such as telephony over the internet protocol (IP).

In the standard IEEE 802.3af a distinction is made between two basic components. The energy consumers are referred to as powered devices (PD) while the energy suppliers are referred to as power sourcing equipment (PSE).

The standard provides for transmission with a direct voltage of 48 V, the current drain in continuous operation being limited to 350 mA. The maximum supply system power is limited to 15.4 watts and the maximum power draw of the terminal after the deduction of power losses is limited to 13 watts. During a start-up phase of 100 ms duration the terminal can pick off 500 mA. Power is supplied to the network devices by way of standard cat. 3 or cat. 5 cables and standardized RJ45 connectors. The method thereby utilizes the fact that only two of the four existing core pairs are used for signal transmission in the case of 10Base-T and 100Base-TX-Ethernet.

A central aspect of the 802.3af standard is the automatic recognition of network devices. This is achieved by means of a method referred to as resistive power discovery. The energy supply device or power sourcing equipment checks the compatibility of the network device or powered device before it supplies operating power by way of the cable. To this end it injects a minimum power at periodic intervals and in this manner identifies whether the terminal has a 25 kOhm terminating resistance. If it does, energy can be supplied by way of the network. The energy supply device or power sourcing equipment then supplies the network device or powered device with low power. The network device can then use its identifier to signal which of five supported power classes it belongs to. The power sourcing equipment can then supply the network device with the required power. Such recognition takes around 1 second in total. The different classes defined in the standard 802.3af, in which the network devices can be operated, are shown in the table below.

| Class | Use | Maximum extraction power (PD) | Terminating resistance | Maximum power |
|---|---|---|---|---|
| 0 | Default | 0.44 to 12.95 W | 4420 Ω ± 1% | 15.4 W |
| 1 | Optional | 0.44 to 3.84 W | 953 Ω ± 1% | 4.0 W |
| 2 | Optional | 3.84 to 6.49 W | 549 Ω ± 1% | 7.0 W |
| 3 | Optional | 6.49 to 12.95 W | 357 Ω ± 1% | 15.4 W |
| 4 | Optional | — | 255 Ω ± 1% | 15.4 W |

The power consumption of the network devices is important for energy economy in the power sourcing equipment. For optimum energy management it is important for the network devices to identify their power class precisely. If it is not possible to identify the precise power class during the start-up phase, the power class 0 (default) is frequently taken as relevant. The power sourcing equipment must therefore supply the maximum energy consumption of 12.95 watts per connected network device regardless of the energy consumption actually required.

Identification of the correct power class is particularly relevant in the case of what are known as modular network devices, as known from communication terminals, as these have to be categorized in different power classes with a different number of extension levels in their power consumption depending on configuration. Known methods for optimum determination of the energy to be supplied in the power sourcing equipment are proprietary protocols after basic initialization of the network devices, with which said network devices signal the required power draw. The disadvantage of this procedure is however that the network device first has to be switched to a state, in which configuration can take place on a software basis.

Administrative interventions in the power sourcing equipment are also known, in particular in the case of network devices, which report the power class 0 (default) to the power sourcing equipment. The actual power consumption is hereby notified to the power sourcing equipment, with the result that a structure-based power limit of the power sourcing equipment is not exceeded. This administrative outlay in respect of organization and cost is disadvantageous in particular in networks, in which the network devices are frequently exchanged and replaced by others.

SUMMARY OF INVENTION

An object of the present invention is therefore to specify measures, which allow notification of the energy requirement actually needed to the energy supplier in a simpler manner.

This object is achieved by a communication system with the features of the independent claims. This object is further achieved by the advantageous embodiments emerging from the dependent claims.

The inventive communication system has power sourcing equipment, referred to as a distributor element, which is coupled to a power supply unit, to which a plurality of network devices can be connected. Each of the network devices connected to the distributor element has at least one network element, each network device being supplied with energy and messages by the distributor element. Each network device is also assigned a sub-assembly, which is set up to determine from a network of passive components a parameter characterizing said network, said parameter allowing information to be provided about the energy requirement of the network device, with each of the network elements of the network device having at least one passive component, which is part of the network.

With the present communication system it is possible in particular to categorize modular network devices without any problem in a precise manner in respect of their power class. Depending on its extension stage, the modular network device has a different parameter as a result of different passive components of the network device. The modularity of the network device is thereby determined by the number and composition of respective network elements.

In an expedient embodiment of the invention the network elements of the network device are coupled together and the passive components of respective network elements are connected together by way of a bus. This makes it possible in a particularly simple manner to connect the passive components together to form a network, from which the sub-assembly can determine the parameter characterizing the network.

In a further development the passive components of respective networks are connected in parallel by way of the bus.

Resistors, capacitors and diodes are preferably used as passive components. It is sufficient if only one passive component, for example a resistor, is provided in each of the network elements respectively. Connecting the passive components by way of the bus causes the total resistance at the sub-assembly to change and said total resistance can then be assigned to a power class according to the IEEE 802.3af standard.

According to one embodiment of the invention the network element connected directly to the distributor element is formed by a communication terminal, i.e. a telephone operating on the basis of the internet protocol, and the further network elements represent communication expansion components. These communication expansion components can for example be acoustic adapters for connecting headsets, display modules, additional keyboard units or card readers.

According to a further advantageous embodiment the distributor element determines the parameters characterizing the networks of the network devices in each instance directly after the communication system has been activated, to determine the maximum power requirements of respective network devices. In other words this means that a network device does not have to have been fully started up in order to determine the parameter of said network device characterizing the energy consumption. In particular it is not necessary for the software running in the network device to transfer the configuration of the network device and transmit a corresponding status in the form of a parameter to the sub-assembly and on to the distributor element. Rather the sub-assembly can determine the parameter and therefore also the power class from the resulting two-pole parameters of the passive bus, said parameter being formed by the network of passive components connected by the (passive) bus. The bus thereby ensures that the selection of the corresponding power class of a network device of any configuration can be determined as early as during the start-up phase in the sub-assembly by means of gate logic without processor or software involvement. It can therefore be determined according to the specifications of the IEEE standard 802.3af.

BRIEF DESCRIPTION OF THE DRAWING

The invention is described in more detail below with reference to the sole FIGURE showing a communication system 10.

DETAILED DESCRIPTION OF INVENTION

The communication system has a distributor element 1 and by way of example a network device 3 connected thereto. For the sake of simplicity only one network device 3 is shown in detail. In practice a plurality of network devices 3 can be connected to the distributor element 1 as may be appreciated from network device 100 shown in dotted lines in the figure. The coupling between the network device 3 and the distributor element 1 is effected by way of a cable 9, which comprises a number of lines 6, 7, 8.

A power supply unit 2 can be integrated in the distributor element 1, as shown in the FIGURE. Such a configuration is referred to as endspan insertion. This involves an active component, for example a switch, which supplies the connected network device 3 directly with power by way of the cable 9. The advantage of such an arrangement is the compact grouping of the functions in one unit. It would also be possible for the distributor element 1 and the power supply unit 2 to be configured as separate components. Such an arrangement is referred to as midspan insertion. With such an embodiment a simple switch, which corresponds to the distributor element 1, can be connected to what is known as a power hub, which takes over the supply of energy to the connected network devices 3.

The network device 3 is supplied with power by way of a line 7 of the cable 9 and the data exchange takes place by way of one or a number of lines 8. A line pair (reference character 6) is also provided to connect a sub-assembly 4 provided in the network device 3. The sub-assembly 4 is also connected to a network 5 comprising at least one passive component 51, 52, 53. During the start-up phase of the network device the terminating resistance across the sub-assembly 4 is scanned by the distributor element 1 by way of the line pair 6. The terminating resistance represents a parameter characterizing the network device 3, which allows the distributor element 1 to categorize into a power class according to the IEEE 802.3af standard.

The inventive communication system 3 is particularly suitable for network devices with a modular structure. In the present exemplary embodiment the network device 3 comprises a network element 31, which can for example be formed by a communication terminal (a telephone operating on the basis of the internet protocol). The sub-assembly 4 and at least one passive component 51 are disposed in this. Two further network elements 32, 33 for example are also provided, each being coupled to the network element 31 by way of a cable 9. Solely by way of example connection in the present exemplary embodiment is effected such that the respective network elements 31, 32, 33 are connected in a serial manner to each other. Each of the further network elements 32, 33, which for example represent communication expansion elements (e.g. a display, an additional keyboard unit, etc.) also has at least one passive component 52 or 53.

In the simplest instance the passive components 51, 52, 53 can respectively be formed by a resistor, said resistors being connected together in a parallel manner by the line pair 6 configured as a bus, as shown. It is also of course possible to configure the passive components 51, 52, 53 from a number of components, in particular resistors, diodes, capacitors. The addition of a further network element will in any case cause the terminating resistance of the network 5 present at the sub-assembly 4 to change. This ensures that a parameter characterizing the network can be determined by the sub-assembly 4, irrespective of the provision for the number or type of the network elements 32, 33, to which parameter a power group of the IEEE 802.3af standard can be assigned in the sub-assembly itself or in the distributor element 1.

The advantage of the described procedure is that no active components, such as processors or software running thereon, have to be in operation to determine the power class of a network device 3. Directly after the start-up phase of the network device the resistance of the network 5 is present at corresponding inputs of the sub-assembly 4, such that the distributor element 1 can plan the power requirement of a plurality of network devices 3 correspondingly.

Further administrative outlay or proprietary protocols, as proposed in the prior art, are therefore no longer necessary.

The invention claimed is:

1. A communication system comprising:
    a distributor element;
    at least one network device, each network device having a sub-assembly and a first network element, the first network element having at least one passive component, the at least one passive component forming a network connected to the sub-assembly, the network of the at least one passive component having a terminal resistance being measurable at the sub-assembly, and
    a connector connecting the distributor element to the network device, the connector having at least one first line, at least one second line, and at least one third line, the at least one first line supplying power to the first network element, the at least one second line forming a communication path along which data is exchangeable between the distributor element and the at least one network device, and the at least one third line connecting the distributor element to the sub-assembly such that the distributor element measures the terminal resistance of the network of the at least one passive component at the sub-assembly to determine a maximum power requirement of the at least one network device; and
    the maximum power requirement of the at least one network device being determined by the distributor element comparing the measured terminal resistance with a plurality of different classes of device power requirements to identify a power class for the at least one network device.

2. The communication system as claimed in claim 1, wherein each network device also has one or more second network elements, each second network element having at least one passive component, the at least one passive component of the first network element and the at least one passive component of the second network element defining the terminal resistance.

3. The communication system as claimed in claim 2, wherein the passive components of the first network element and at least one second network element are connected via a bus.

4. The communication system as claimed in claim 3, wherein the passive components are resistors and the resistors are connected in parallel via the bus.

5. The communication system as claimed in claim 2, wherein the first network element is a communication terminal and the second network element is a communication expansion component connected to the communication terminal.

6. The communication system as claimed in claim 1, wherein the at least one passive component is a component selected from the group consisting of a resistor, a capacitor, a diode, and any combination thereof.

7. The communication system as claimed in claim 1, wherein the distributor element measures the terminal resistance during a start-up phase of the at least one network device to determine the maximum power requirement of each network device and select a power class for each network device.

8. The communication system as claimed in claim 1, wherein data and power transmission is performed according to standard IEEE 802.3af.

9. The communication system as claimed in claim 1, wherein the at least one network device is at least one communication terminal and wherein the measuring of the terminal resistance occurs during a start-up phase of the at least one network device.

10. The communication system as claimed in claim 1, wherein the network device has a modular structure and wherein the power classes are defined according to standard IEEE 802.3af and the comparing of the measured terminal resistance with the plurality of different classes of device power requirements to identify the power class for the at least one network device is comprised of categorizing the power class for the at least one network device as being within one of the different classes of device power requirements.

11. The communication system as claimed in claim 1, wherein the distributor element measures the terminal resistance for each network device via gate logic without processor or software involvement at the sub-assembly.

12. A communication system comprising:
    a distributor element having a power supply unit integrated therein;
    a network device having a sub-assembly, a first network element, and at least one second network element, the first network element having a passive component, the at least one second network element having a passive component;
    a network formed by the passive components of the first network element and the at least one second network element being connected in parallel with the sub-assembly, the network having a terminal resistance being measurable at the sub-assembly, the terminal resistance being a parameter characterizing the network of the passive components; and
    a connector connecting the distributor element to the network device, the connector having at least one first line, at least one second line, and at least one third line, the at least one first line supplying power to the first network element and each of the at least one second network element in series, the at least one second line providing a path along which data is exchangeable between the distributor element, the first network element, and the at least one second network element, and the at least one third line connecting the distributor element to the sub-assembly, the distributor element measuring the terminal resistance of the network at the sub-assembly to identify a maximum power requirement of the network device; and the maximum power requirement of the network device being determined by the distributor element during a start-up phase of the network device by comparing the measured terminal resistance with a plurality of different classes of device power requirements to identify a power class for the network device.

13. The communication system as claimed in claim 12, wherein the network device is a communication terminal; and wherein the comparing of the measured terminal resistance with the plurality of different classes of device power requirements to identify a power class for the network device is comprised of categorizing the power class for the network device as being within one of the plurality of power classes.

14. The communication system as claimed in claim 12, wherein the passive components are connected via a bus.

15. The communication system as claimed in claim 12, wherein each passive component is a component selected from the group consisting of a resistor, a capacitor, and a diode.

16. The communication system as claimed in claim 12, wherein the first network element is a communication terminal and one of the at least one second network element is a communication expansion component connected in series to the communication terminal.

17. The communication system as claimed in claim 12, wherein the at least one passive component is comprised of a plurality of passive components and the measured terminal resistance of the network of the at least one passive component is a sum of resistances for each of the passive components.

18. The communication system as claimed in claim 12, wherein the comparing of the measured terminal resistance with a plurality of different classes of device power requirements to identify a power class for the network device is comprised of categorizing the power class for the network device as being within one of the plurality of power classes.

19. The communication system as claimed in claim 12, wherein the distributor element measures the terminal resistance via gate logic without processor or software involvement at the sub assembly.

20. The communication system as claimed in claim 12, wherein the power classes are defined according to standard IEEE 802.3af and data and power transmission is performed according to standard IEEE 802.3af.

* * * * *